Feb. 27, 1923.

C. W. LEE 1,447,139

TOOL HOLDER

Filed July 16, 1921

Charles W. Lee
INVENTOR

BY Victor J. Evans
ATTORNEY

WITNESS:

Patented Feb. 27, 1923.

1,447,139

UNITED STATES PATENT OFFICE.

CHARLES WALTER LEE, OF PHILADELPHIA, PENNSYLVANIA.

TOOL HOLDER.

Application filed July 16, 1921. Serial No. 485,267.

*To all whom it may concern:*

Be it known that I, CHARLES WALTER LEE, a citizen of the United States, residing at Philadelphia, in the county of Philadelphia and State of Pennsylvania, have invented new and useful Improvements in Tool Holders, of which the following is a specification.

My present invention has reference to a tool holder.

My object is to produce a tool holder, for machinists' use, wherein steel tools, such as bits, of a comparatively short length, can be effectively gripped.

A further object is to produce a tool holder in which the stock is provided with an angularly arranged socket, entering from one end thereof, the said socket having hingedly supported therein an element designed to contact with the tool when the latter is arranged in the socket, said hinged element being engaged by a screw which is threaded in the stock for forcing the same against the tool when the latter is arranged in the socket, while means is provided for limiting the swinging of the said element in the direction of the tool.

The drawings illustrate an embodiment of the improvement.

In the drawings:—

Figure 1:
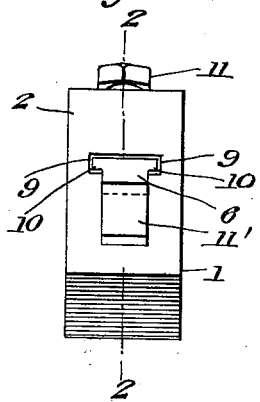
Figure 1 is a front elevation of a tool holder constructed in accordance with this invention.

Referring now to the drawings in detail, the numeral 1 designates the stock of my improved tool holder. The stock has its headed end widened upon its upper face, as at 2, the end of the head being arranged at an angle, and the lower corner of the said angle face being cut inwardly. The stock 1 is provided with an angularly arranged socket 3 that enters from the angle face thereof, the upper and end wall of the socket having a rounded transverse depression 4 for the reception of the rounded eye 5 upon a plate or tongue 6. A pivot 7 passes through the eye 5 and hingedly connects the plate or tongue 6 in the socket. The socket is indicated, for distinction, by the numeral 8, and the side walls, at the outer end thereof are provided with lateral depressions 9, the same being of a considerable depth and receiving therein lugs 10 formed upon the outer corners of the swinging plate or tongue 6.

Figure 2:
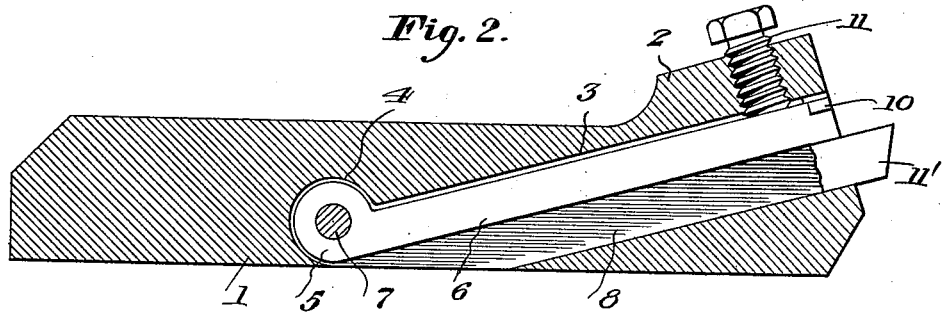
Figure 2 is an approximately central vertical longitudinal sectional view on the line 2—2 of Figure 1.

The head has a threaded opening which communicates with the socket, and engaging the threads of the said opening is the shank of a bolt member 11. The bolt member contacts with the upper face of the plate or tongue 6 and when adjusted is designed to move the outer end of the member 6 downwardly in the socket to bind against a tool 11' which is received in the socket. By reference to Figure 2 of the drawings, it will be noted that a tool of comparatively short length can be effectively engaged by the holder, and it is thought that the foregoing description, when taken in connection with the drawings will fully set forth the construction, operation and advantages of the improvement to those skilled in the art to which such inventions relate.

Having described the invention, I claim:—

1. A tool including a stock having an angle socket entering from one end thereof, a plate arranged longitudinally in the socket and having its inner end pivotally secured therein, means between the outer end of the plate and the stock for limiting the swinging of the plate in the socket, and means also carried by the stock and adjustable thereon contacting the plate inward of said limiting means for swinging the same in the socket.

2. A tool holder including a stock having an angle socket entering from one of its ends and extending through its base and being provided with a transverse depression in a line with the wall of the socket at the terminal thereof, a plate received in the socket having an eye portion disposed in the depression, a pivot passing through the eye securing the plate in the socket, said plate having its opposite end terminating in a line with the outer end of the stock and its sides at its said end having laterally extending lugs, the side walls provided by the socket having lateral depressions of a greater depth than the thickness of the lugs receiving the lugs therein and limiting the swinging movement of the plate in the socket, and adjustable means contacting the plate for swinging the same inwardly of the socket.

In testimony whereof I affix my signature.

CHARLES WALTER LEE.